C. P. MILLER AND R. R. LEE.
SEED POTATO CUTTER.
APPLICATION FILED AUG. 13, 1919.
1,354,263. Patented Sept. 28, 1920.
5 SHEETS—SHEET 1.
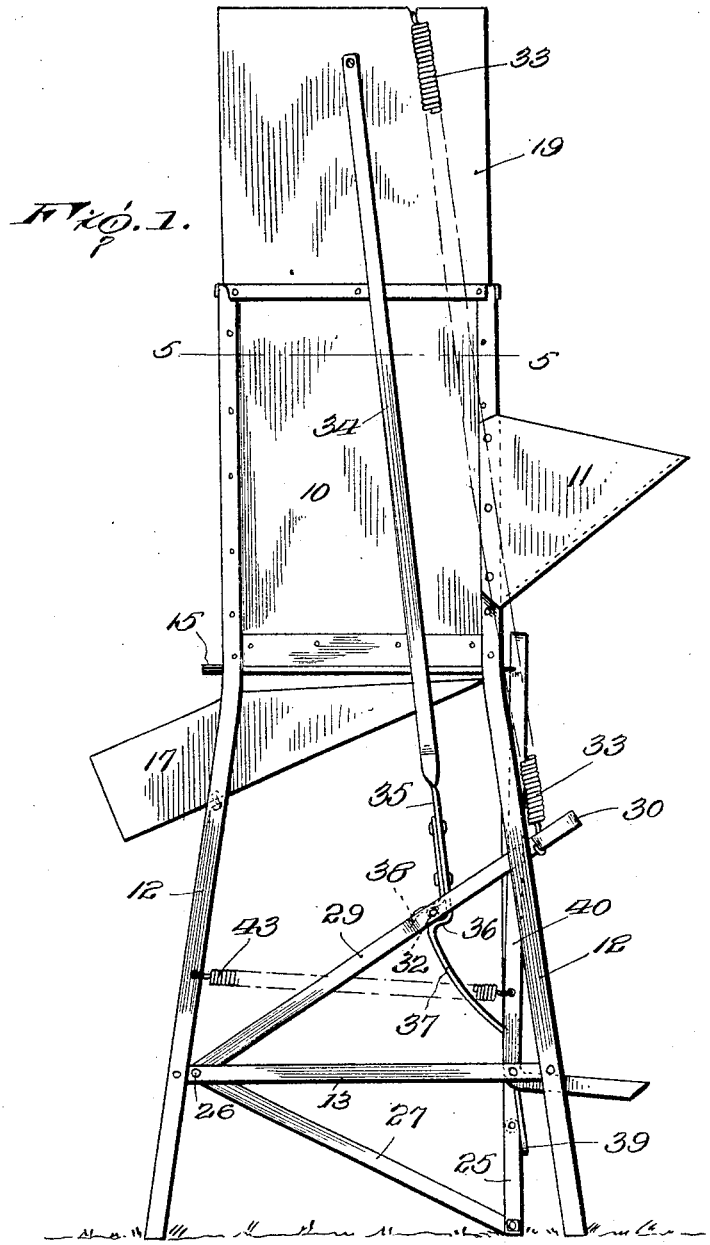
Inventors:
C. P. Miller
R. R. Lee
by, Lacey & Lacey,
Attorneys.

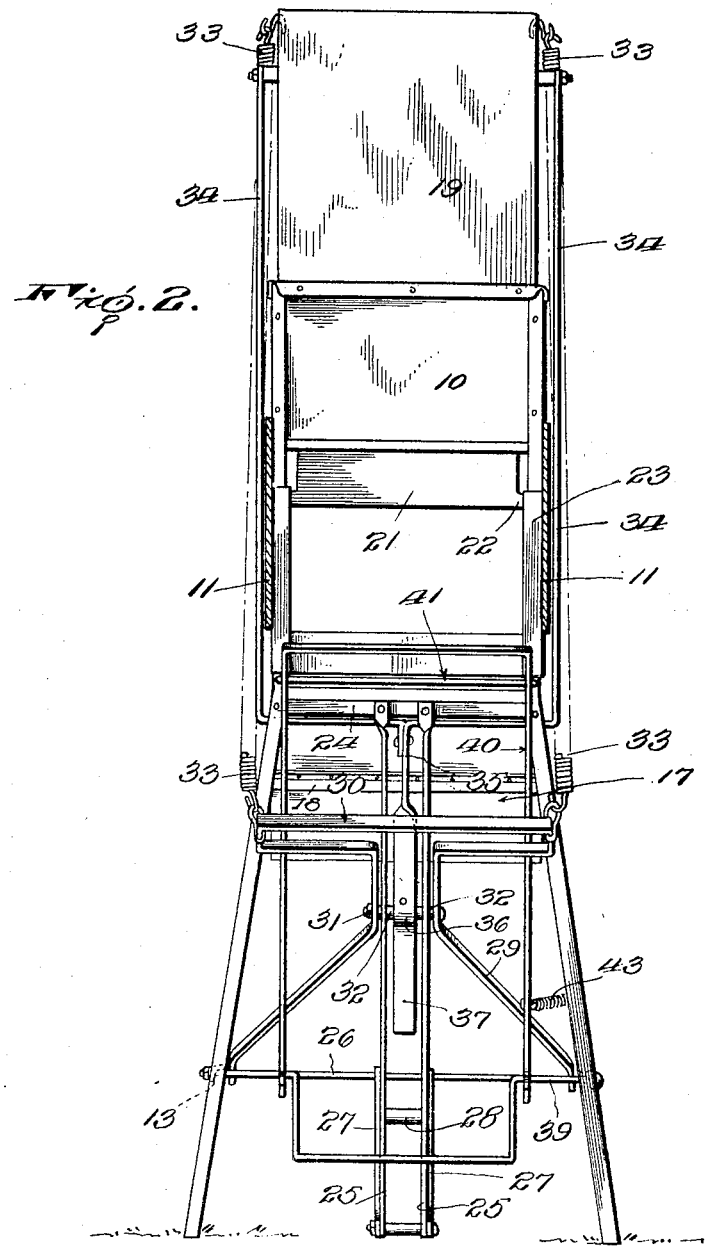

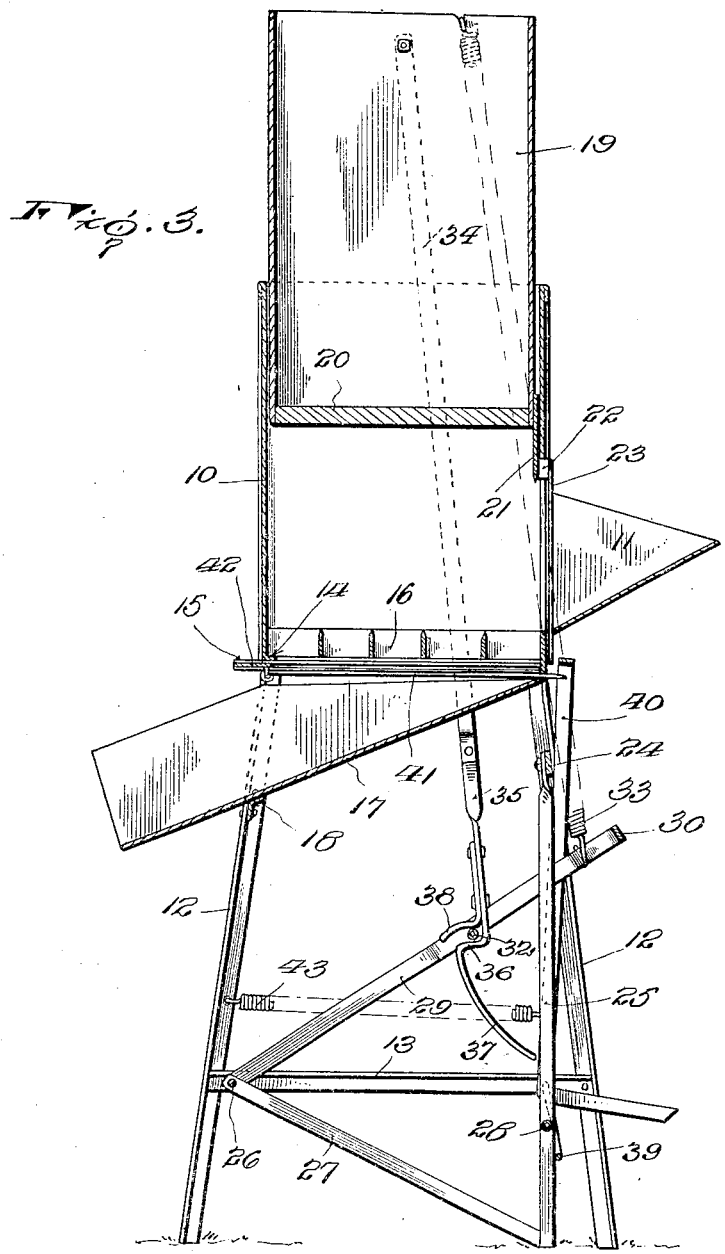

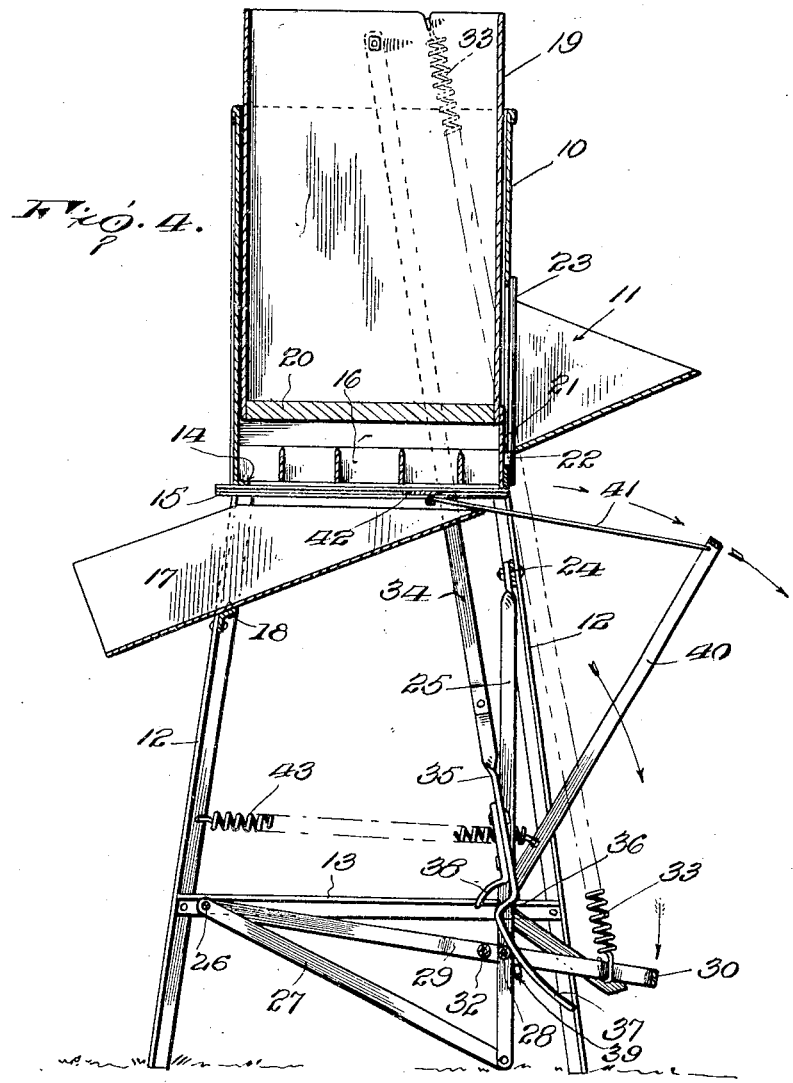

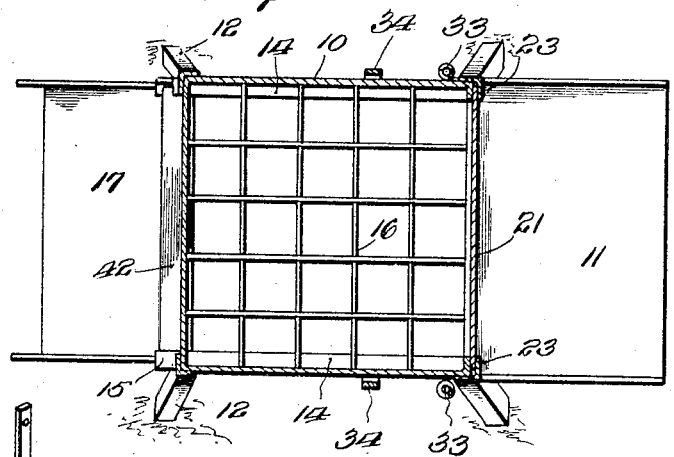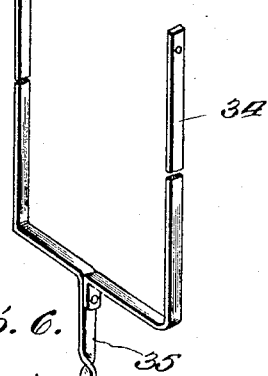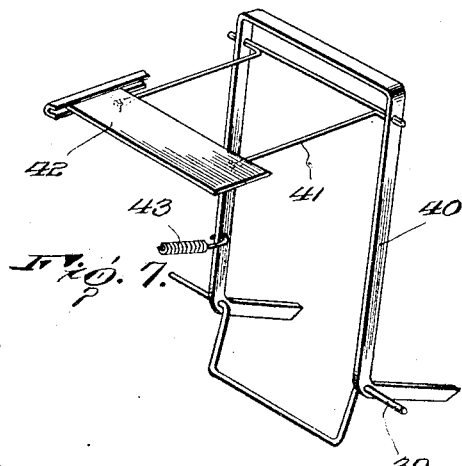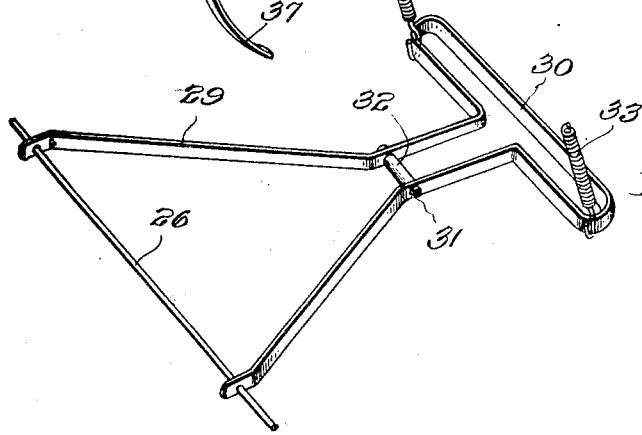

UNITED STATES PATENT OFFICE.

CARL P. MILLER AND RALPH R. LEE, OF FARGO, NORTH DAKOTA.

SEED-POTATO CUTTER.

1,354,263.  Specification of Letters Patent.  Patented Sept. 28, 1920.

Application filed August 13, 1919. Serial No. 317,367.

*To all whom it may concern:*

Be it known that we, CARL P. MILLER and RALPH R. LEE, citizens of the United States, residing at Fargo, in the county of Cass and State of North Dakota, have invented certain new and useful Improvements in Seed-Potato Cutters, of which the following is a specification.

This invention relates to an improved seed potato cutter and has as one of its principal objects to provide a device of this character which will greatly simplify and expedite the operation of cutting seed potatoes.

The invention has as a further object to provide a device of this character employing a foot-operated plunger for forcing the potatoes against the cutting knife, wherein the potatoes will be fed into the cutting chamber or casing of the device from a suitable hopper, and wherein means will be provided, when the plunger is forced downwardly, for cutting off any potatoes projecting from the hopper into the casing so that downward movement of the plunger will be unobstructed.

The invention has as a still further object to provide a device wherein after the plunger has completed its downward stroke, a cleaning knife will be moved beneath the main cutting knife for severing the potatoes at right angles to the main knife, the potatoes being thus cut in two directions.

A still further object of the invention is to provide a device employing a foot lever for operating the plunger, wherein in the first portion of the travel of the lever the plunger will be actuated and wherein trip mechanism will be provided for then releasing the plunger from the lever when continued movement of the lever will serve to actuate the cleaning knife.

And the invention has as a still further object to provide a device wherein the plunger and other associated parts will be automatically returned to normal position so that the device may thus be operated by simply actuating the foot lever.

Other and incidental objects will appear hereinafter.

In the drawings:

Figure 1 is a side elevation of the device showing the parts in normal position, Fig. 2 is a front elevation, parts of the hopper being broken away, Fig. 3 is a vertical section taken centrally through the device, Fig. 4 is a view similar to Fig. 3 but showing the plunger lowered, Fig. 5 is a horizontal section taken on the line 5—5 of Fig. 1, Fig. 6 is a detail perspective view of the plunger yoke employed, Fig. 7 is a detail perspective view showing the cleaning knife and the lever for actuating said knife, and Fig. 8 is a detail perspective view of the foot lever of the device.

In carrying the invention into effect, we employ a casing 10 preferably rectangular in cross section and provided at its forward side with a suitable opening about which is fixed a hopper 11. Supporting the casing are legs 12 between the lower end portions of which extend cross braces 13. The casing is open at its ends and projecting inwardly from the sides of the casing at its lower end are lateral flanges 14 beneath which are secured oppositely disposed channel guide strips 15 projecting at the rear of the casing. Removably resting upon the flanges 14 is a main cutting knife 16, this knife being formed of a plurality of crossed blades extending at right angles to each other and secured together at their points of intersection. Extending rearwardly from beneath the casing is a discharge chute 17 supported by a cross brace 18 extending between that pair of the legs 12 at the rear of the casing. Slidably fitting within the casing is a hollow plunger 19 closed at its lower end by a head 20 which is preferably formed of wood. Secured to the forward side of the plunger at its lower end is a severing knife 21 provided at its lower end with lateral ears or flanges 22 slidably engaging beneath vertical flanges 23 at the sides of the front opening in the casing. The flanges 23 will thus serve to guide and support the knife in its vertical movement. The hopper 11 is, of course, designed to contain a supply of potatoes to be cut and as will be observed, the knife 22 will, when the plunger is moved downwardly, serve to sever any of the potatoes projecting from the hopper into the casing so that the downward movement of the plunger will be unhampered. Secured to that pair of the legs 12 at the forward side of the casing is a cross bar 24 arranged adjacent the upper ends of said legs and secured at their upper ends to this cross bar is a pair of medially arranged vertical guide rods 25. Extending between the braces 13 adjacent that pair of the legs 12 at the rear side of the casing is a cross rod 26 and connected at their rear ends to this rod is a pair of spaced brace rods 27 secured at their forward ends to the lower ends of the vertical guide rods 25, a suitable spacer sleeve being interposed between the guide rods upon the bolt connecting the several rods. Extending transversely between the guide rods adjacent their lower ends is a cross pin upon which is mounted a detent roller 28. The purpose of this roller will presently appear.

Mounted to rock upon the cross rod 26 is a foot lever 29 which, as shown in detail in Fig. 8, is preferably formed from a single piece of material bent to provide a laterally elongated head 30 from which extend spaced arms lying in parallel relation adjacent the head and thence diverging rearwardly, the rear ends of the arms freely receiving the cross rod 26 therethrough. The parallel portions of the arms lie at the outer sides of the vertical guide rods 25 and connecting the rear ends of these portions of said arms is a cross bolt or pin 31 upon which is mounted a roller 32 and engaged at their lower ends at the ends of the head 30 of the lever are springs 33 hooked at their upper ends over the upper edges of the side walls of the plunger. Embracing the casing 10 is a yoke 34, the arms of which are, adjacent their upper ends, pivotally connected to the side walls of the plunger so that the yoke thus depends from the plunger beneath the casing. The yoke is, as particularly shown in Fig. 6, provided with a downwardly directed stem 35 bent adjacent its lower end to form a laterally and rearwardly directed hook or shoulder 36 from which the stem is then continued to form a downwardly and forwardly curved cam or arm 37. Secured to the rear side of the stem above the hook 36 is a laterally and rearwardly projecting arm 38 which is curved longitudinally downward toward its free end so that, as shall presently appear, this arm is also adapted to provide a cam. As will now be observed upon particular reference to Figs. 1 and 3 of the drawings, the roller 32 upon the cross pin 31 of the foot lever is normally engaged beneath the arm 38 while the arm 37 of the stem 35 of the plunger yoke is adapted to be freely received between the vertical guide rods 25. The arm 37 will thus coact with said guide rods for directing the yoke stem when the plunger is shifted downwardly. However, since the throw of the head 30 of the foot lever 29 is greater than the travel of the plunger, the springs 33 will act upon the foot lever for retracting this lever and normally holding said lever retracted, upward pull upon the lever acting through the roller 32, arm 38, and the yoke, to also retract the plunger.

Journaled at its end portions through the forward end portions of the cross braces 13 is a cross rod 39 the intermediate portion of which is, as particularly shown in Fig. 7, depressed so as to permit complete downward movement of the foot lever 29. Mounted to rock upon said rod is a compound bell crank 40, the long arms of which extend upwardly and are connected at their upper ends while the short arms of said bell crank project forwardly into the path of travel of the head 30 of the foot lever. Mounted to rock upon the long arms of the lever adjacent their upper ends, is a substantially U-shaped coupling member 41 which, as also shown in detail in Fig. 7, is preferably formed from a length of material bent to provide parallel arms joined at their inner ends by a transverse connecting portion, the rebent ends of which form trunnions freely engaging through the long arms of the bell crank. At their free ends, the arms of the coupling member are suitably secured to a cleaning knife 42 mounted to slide within the guides 15 at the bottom of the casing 10 beneath the main cutting knife 16. Connected to one of the long arms of the bell crank adjacent the lower end thereof, is a spring 43 secured to one of the rear legs of the device and adapted to return the bell crank to its normal position and retract the knife 42.

In use, the parts will, as previously explained, normally stand in the position shown in Figs. 1, 2 and 3 of the drawings so that a supply of potatoes to be cut may be placed within the hopper 11. Some of the potatoes will thus roll into the casing 10 upon the knife 16 so that the foot lever 29 may be depressed for shifting the plunger downwardly and forcing the potatoes within the casing through the knife 16 to be cut thereby, the cut potatoes being discharged into the discharge chute 17 to be directed thereby into a suitable container. The roller 32 upon the cross pin 31 will, of course, coact with the hook 36 of the stem 35 of the plunger yoke for shifting the plunger downwardly when the foot lever is depressed. However, as the plunger approaches the lower end of its travel, the arm 37 will be moved into engagement with the roller 28 so that upon continued movement of the foot lever the arm will coact with said roller for rocking the plunger yoke forwardly at its rear end and shifting the hook 36 out of engagement with the roller 32, the plunger having reached the bottom of its stroke when this occurs. Consequently, the foot lever may be continued in its downward movement while the plunger will remain stationary. The purpose of the roller 28, therefore, becomes apparent. Continued downward movement of the foot lever will then bring the head 30 of said lever into engagement with the short arms of the bell crank 40 so that as downward travel of the foot lever is completed, the long arms of the bell crank will be rocked forwardly, consequently shifting the cleaning knife 42 forwardly to sever the downwardly projecting portions of any potatoes lodged on the main cutting knife 16. Thus, at each downward stroke of the foot lever any potatoes projecting from the hopper 11 into the casing 10 will, as previously explained, be severed to permit free downward movement of the plunger while potatoes within the casing will be forced against the main cutting knife to be cut thereby and finally the downwardly projecting portions of the potatoes lodged on the main cutting knife will be severed. In this connection particular attention is directed to the fact that the plunger does not move into engagement with the main cutting knife but, on the other hand, when the plunger is at the bottom of its stroke, the head 20 of the plunger is spaced above said knife. Consequently, potatoes resting upon the main cutting knife will not be forced clear through the knife at one operation of the plunger but will be impinged thereon and partially severed. Thus, the potatoes will be cut in one direction by the main cutting knife while, when the cleaning knife 42 is shifted, the potatoes will be cut in another direction by this latter knife so that substantially all potatoes passing through the device will be cut up into relatively small parts. Upon release of the foot lever 29, the bell crank 40 will be immediately retracted so that the cleaning knife 42 will be returned to its original position. Coincidentally, the springs 33 will, as previously explained, retract the foot lever so that the roller 32 thereof will be shifted into engagement with the arm 38 of the plunger yoke. This arm will then coact with the roller for swinging the yoke stem rearwardly and moving the hook 36 to a position engaging beneath the roller, the roller at the same time bearing beneath the arm 38 for shifting the plunger upwardly to its original position as the foot lever is retracted. Upward movement of the plunger will, of course, elevate the knife 21 so that potatoes from the hopper 11 may then roll into the casing 10 when the operation of depressing the plunger may be repeated.

Having thus described the invention, what is claimed as new is:

1. A device of the character described including a casing, a plunger shiftable therein, a cutting knife carried by the casing, means for shifting the plunger toward the cutting knife, means for releasing the plunger from said first-mentioned means before the plunger reaches the cutting knife, and a second cutting knife shiftable relative to the first knife.

2. A device of the character described including a casing, a plunger reciprocable therein, a cutting knife carried by the casing, means for shifting the plunger toward the cutting knife, means for releasing the plunger from said first-mentioned means before the plunger reaches the cutting knife, and a second cutting knife shiftable by said first-mentioned means relative to the first knife after release of the plunger.

3. A device of the character described including a casing, a plunger reciprocable therein, a cutting knife carried by the casing, a second cutting knife, a common means for actuating the plunger and the latter knife, and means for releasing the plunger from said first-mentioned means before reaching the first cutting knife.

4. A device of the character described including a casing, a plunger reciprocable therein, a cutting knife carried by the casing, a second cutting knife, means for shifting the latter knife, and means for shifting the plunger toward the first knife, said means being free of but engageable with said first-mentioned means for subsequently shifting the latter knife.

5. A device of the character described including a casing, a plunger reciprocable therein, a cutting knife carried by the casing, a second cutting knife shiftable relative to the first knife, and pivoted means operable during the first portion of its travel for shifting the plunger toward the first knife and during the latter portion of its travel for shifting the latter knife.

6. A device of the character described including a casing, a plunger reciprocable therein, a cutting knife carried by the casing, a second cutting knife shiftable relative to the first knife, pivoted means operable during the first portion of its travel for shifting the plunger toward the first knife and during the latter portion of its travel for shifting the latter knife, and means for releasing the plunger from said pivoted means at a predetermined point in the travel thereof.

7. A device of the character described including a casing, a plunger reciprocable therein, a cutting knife carried by the casing, a second cutting knife shiftable relative to the first knife, means for shifting the latter knife, pivoted means for shifting the plunger toward the first knife and movable to engage said first-mentioned means for shifting the latter knife, and means for disengaging the plunger from said pivoted means before actuation of said first-mentioned means by said pivoted means.

8. A device of the character described including a casing, a cutting knife carried thereby, a plunger reciprocable within the casing, a lever, means connecting the plunger with said lever whereby the plunger may be shifted toward the cutting knife, and means arranged to coact with said first-mentioned means for releasing the plunger from the lever when the plunger reaches the bottom of its stroke.

9. A device of the character described including a casing, a plunger reciprocable therein, a cutting knife carried by the casing, a lever, a yoke connecting the plunger with the lever whereby the plunger may be shifted toward the cutting knife, and a detent mounted to coact with said yoke for disengaging the yoke from the lever and releasing the plunger when the plunger reaches the bottom of its stroke.

10. A device of the character described including a casing, a plunger reciprocable therein, a cutting knife carried by the casing, a lever, a yoke carried by the plunger and provided with a stem formed adjacent its free end with a shoulder and a cam arm, the shoulder normally coacting operatively with the lever for connecting the plunger thereto whereby the lever may be operated for shifting the plunger toward the cutting knife, and a detent arranged for engagement by said cam arm, whereby the yoke stem will be released from the lever to free the plunger when the plunger reaches the bottom of its stroke.

11. A device of the character described including a casing, a plunger reciprocable therein, a cutting knife carried by the casing, a lever, a yoke carried by the plunger and provided with a stem normally coacting with the lever for connecting the plunger thereto whereby the plunger may be shifted toward the cutting knife, means arranged to coact with the plunger stem for disengaging said stem from the lever to free the plunger when the plunger reaches the bottom of its stroke, and a cam arm carried by the yoke stem to operatively coact with the lever when released, whereby the yoke stem will again be connected with the lever.

12. A device of the character described including a casing, a plunger reciprocable therein, a knife fixed in the casing, a lever for shifting the plunger toward said knife, a second knife, and a bell crank connected with the second knife and projecting into the path of the lever to be engaged thereby and shift the second knife relative to the first knife.

13. A device of the character described including a casing, a plunger reciprocable therein, a cutting knife carried by the casing, spring returned means for shifting the plunger toward the cutting knife, means for releasing the plunger from said first-mentioned means when the plunger reaches the bottom of its stroke, and means for connecting the plunger with said first-mentioned means when said first-mentioned means is released.

14. A device of the character described including a casing, a plunger reciprocable therein, a cutting knife carried by the casing, a spring returned lever, a yoke connecting the plunger with the lever whereby the plunger may be shifted toward the cutting knife, means for disengaging the yoke from the lever when the plunger reaches the bottom of its stroke, and means carried by the yoke to operatively coact with the lever for connecting the yoke with the lever when said lever is released.

15. A device of the character described comprising a fixed knife, a plunger movable toward and from said knife, a reciprocatory knife arranged below and adjacent the fixed knife, a lever disposed below the knives, connections between said lever and the plunger whereby to move the plunger toward the fixed knife, a bell-crank having one end connected with the reciprocatory knife and its other end projecting into the path of the lever whereby to draw the reciprocatory knife across the plane of the fixed knife during the closing portion of the movement of the lever, and means for returning the bell-crank to initial position as the pressure of the lever thereon is released.

16. A device of the character described comprising a frame, a detent thereon, a lever fulcrumed on the frame, a casing on the frame, a fixed knife in the casing, a plunger mounted in the casing above the knife, a resilient connection between the lever and the plunger, a stem pivotally attached to the plunger and extending below the same and the fixed knife, the stem having a shoulder and terminating in a cam below said shoulder to ride on the detent, a pin on the lever to engage said shoulder and releasable therefrom by the action of the cam on the detent, and a cam arm projecting from the stem above the shoulder thereon to be engaged by the pin on the lever as the lever rises.

In testimony whereof we affix our signatures.

CARL P. MILLER. [L. S.]
RALPH R. LEE. [L. S.]